United States Patent
Skarve et al.

(10) Patent No.: US 10,979,197 B2
(45) Date of Patent: Apr. 13, 2021

(54) TRANSMITTING DEVICE AND METHOD PERFORMED THEREIN FOR HANDLING COMMUNICATION

(71) Applicant: Telefonaktiebolaget LM Ericsson (publ), Stockholm (SE)

(72) Inventors: Martin Skarve, Enebyberg (SE); Torsten Dudda, Aachen (DE); Torbjörn Örtengren, Linköping (SE); Samir Shah, Ottawa (CA); Mikael Wittberg, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 38 days.

(21) Appl. No.: 16/334,179

(22) PCT Filed: Feb. 1, 2019

(86) PCT No.: PCT/SE2019/050087
§ 371 (c)(1),
(2) Date: Mar. 18, 2019

(87) PCT Pub. No.: WO2019/160469
PCT Pub. Date: Aug. 22, 2019

(65) Prior Publication Data
US 2020/0119883 A1 Apr. 16, 2020

Related U.S. Application Data

(60) Provisional application No. 62/630,312, filed on Feb. 14, 2018.

(51) Int. Cl.
*H04J 3/16* (2006.01)
*H04L 5/00* (2006.01)

(52) U.S. Cl.
CPC .......... *H04L 5/0053* (2013.01); *H04L 5/0032* (2013.01)

(58) Field of Classification Search
None
See application file for complete search history.

(56) References Cited

U.S. PATENT DOCUMENTS

2003/0099305 A1* 5/2003 Yi .................... H04W 28/02
375/295
2003/0202501 A1* 10/2003 Jang ................... H04L 1/1685
370/346

(Continued)

FOREIGN PATENT DOCUMENTS

EP  3121981 A1  1/2017
RU  2549518 C2  4/2015

OTHER PUBLICATIONS

"3GPP TS 36.322 V15.0.0", 3rd Generation Partnership Project; Technical Specification Group Radio Access Network; Evolved Universal Terrestrial Radio Access (E-UTRA); Radio Link Control (RLC) protocol specification (Release 15), Dec. 2017, pp. 1-45.

(Continued)

*Primary Examiner* — Kwang B Yao
*Assistant Examiner* — Juvena W Loo
(74) *Attorney, Agent, or Firm* — Murphy, Bilak & Homiller, PLLC

(57) ABSTRACT

Embodiments herein relate to a method performed by a transmitting device (120) for handling communication in a wireless communications network, wherein the transmitting device (120) comprises at least two radio link control, RLC, entities and is configured with a split bearer to a receiving device (100). The transmitting device (120) identifies that a last transmitted protocol data unit, PDU, of one of the at least two RLC entities, is lacking a poll indicator requesting a status of one or more transmitted PDUs. When identifying (Continued)

that the last transmitted PDU lacks the poll indicator, the transmitting device transmits to the receiving device (100), a PDU comprising a poll indicator.

21 Claims, 10 Drawing Sheets

(56) References Cited

U.S. PATENT DOCUMENTS

| | | | | |
|---|---|---|---|---|
| 2006/0056441 | A1* | 3/2006 | Jiang | H04L 1/1883 370/449 |
| 2006/0245410 | A1* | 11/2006 | Jiang | H04L 47/263 370/346 |
| 2013/0039269 | A1* | 2/2013 | Kubota | H04L 1/187 370/328 |
| 2016/0150423 | A1* | 5/2016 | Jeong | H04L 1/0026 455/67.11 |
| 2017/0064768 | A1 | 3/2017 | Lee et al. | |
| 2017/0353914 | A1* | 12/2017 | Jung | H04W 72/0453 |
| 2018/0324641 | A1* | 11/2018 | Tsai | H04L 69/321 |
| 2018/0352511 | A1* | 12/2018 | Martin | H04W 72/048 |
| 2019/0230667 | A1* | 7/2019 | Loehr | H04W 8/02 |
| 2019/0253921 | A1* | 8/2019 | Shin | H04W 28/06 |
| 2019/0253926 | A1* | 8/2019 | Kim | H04W 28/0278 |
| 2020/0059324 | A1* | 2/2020 | Martin | H04L 1/1874 |
| 2020/0107394 | A1* | 4/2020 | Lee | H04L 1/1685 |

OTHER PUBLICATIONS

"3GPP TS 38.322 V15.0.0", 3rd Generation Partnership Project; Technical Specification Group Radio Access Network; NR; Radio Link Control (RLC) protocol specification (Release 15), Dec. 2017, pp. 1-32.

"3GPP TS 38.300 V15.0.0", 3rd Generation Partnership Project; Technical Specification Group Radio Access Network; NR; NR and NG-RAN Overall Description; Stage 2 (Release 15), Dec. 2017, pp. 1-68.

* cited by examiner

TRANSMITTING DEVICE AND METHOD PERFORMED THEREIN FOR HANDLING COMMUNICATION

TECHNICAL FIELD

Embodiments herein relate to a transmitting device and method performed therein regarding wireless communication. In particular, embodiments herein relate to handling communication of the transmitting device in a wireless communications network.

BACKGROUND

In a typical wireless communications network, wireless devices, also known as wireless communication devices, mobile stations, stations (STA) and/or user equipments (UE), communicate via a Radio Access Network (RAN) with one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a NodeB, a gNodeB, or an eNodeB. The service area or cell area is a geographical area where radio coverage is provided by the radio network node. The radio network node operates on radio frequencies to communicate over an air interface with the wireless devices within range of the radio network node. The radio network node communicates over a downlink (DL) to the wireless device and the wireless device communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

For NR, the dual connectivity (DC) protocol architecture of a split bearer is specified, building on the protocol architecture used for LTE for the DC split bearer. In DC the UE is connected to two distinct radio nodes. The UE maintains a packet data convergence protocol (PDCP) entity for the split bearer connected to multiple, e.g. 2, radio link control (RLC) and media access control (MAC) entities, as well as physical layer entities (PHY). These are each associated to a cell group, a master cell group and a secondary cell group respectively. Transmission via the master cell group goes to the Master gNB (MgNB), eNB in LTE terminology; transmission via the secondary cell group goes to the Secondary gNB (SgNB). MgNB and SgNB maintain their own RLC and MAC entities associated to this single split bearer. A further node or function, packet processing function (PPF), which may be separate, or collocated with MgNB or SgNB terminates the PDCP protocol on the network side. In this functional split, the centralized unit terminating PDCP may also be called centralized unit (CU) while the remaining nodes implementing the protocol layers below PDCP may be denoted distributed units (DU). In DC, data units on PDCP may be routed ("switched") via either of the lower layers, or distributed (routed, "split" among both lower layers, or duplicated via both as further described below.

FIG. 1 describes the DC architecture in 3GPP NR (also applicable for LTE) in which for UL data, either switching, splitting or duplication can be applied on PDCP level.

Furthermore, for NR, the carrier aggregation (CA) protocol architecture is specified. In carrier aggregation the UE is connected to one radio node via multiple, e.g. 2, carriers, i.e. maintains two physical layers (PHY). Besides this, the protocol stack consists of one MAC, RLC and PDCP. This way, in CA, on MAC, data units to be transmitted may be routed via both carriers. An exception is packet duplication, where the protocol stack entails two RLC logical channels, to which PDCP routes duplicates, and where transmission of each RLC logical channel is done on a separate carrier by MAC to improve reliability.

FIG. 2 describes the CA architecture in 3GPP NR, also applicable for LTE, with the special configuration of applying PDCP duplication among the two RLC entities associated with transmissions on the respective carriers.

Generally, when packet duplication is configured for a radio bearer by radio resource control (RRC), an additional RLC entity and an additional logical channel are added to the radio bearer to handle the duplicated PDCP protocol data units (PDU). Duplication at PDCP therefore consists in sending the same PDCP PDUs twice: once on the original RLC entity and a second time on the additional RLC entity. With two independent transmission paths, packet duplication may be used to increase reliability and reduce latency and is especially beneficial for ultra-reliable low latency communications (URLLC) services. When duplication occurs, the original PDCP PDU and the corresponding duplicate shall not be transmitted on the same carrier. The two different logical channels can either belong to the same MAC entity in case of CA or to different MAC entities in case of DC. In the former case, logical channel mapping restrictions are used in MAC to ensure that the two logical channels carrying duplicated data are never scheduled on the same carrier. Once configured, duplication can be activated and deactivated per data radio bearer (DRB) by means of a MAC control element (CE).

The UL behavior can be configured by the network via RRC reconfiguration, alternatives to duplication configuration. The UL can be configured for switching, where the PDCP entity sends packets via the RLC entity configured as primary RLC entity. By means of RRC reconfiguration the primary RLC entity can be switched. The UL can also be split in which case a threshold for PDCP buffering is configured. If the buffered data is above the threshold, data can be transmitted via one of the RLC lower layers. If the buffered data is below the threshold, transmission is only allowed via the configured primary RLC entity. Data available reporting for buffer status reporting (BSR) follows the same conditions.

In the NR, cf. 3GPP TS 38.322 V15.0.0 (2017-12), RLC defines the radio link control protocol. Higher layer data such as service data units (SDU) are encapsulated in protocol data units (PDU) for transmission. Segmentation of the SDUs is applied if the SDU cannot fit into the transport block size for the transmission of the PDU. In acknowledged mode (AM) the receiver sends a status report about reception status of the SDUs and SDU segments to the transmitter. Based on this, the transmitter does retransmissions of SDUs or SDU segments. Re-segmentation may need to be applied if an SDU segment needs to be retransmitted, but does not fit into the new transport block size for retransmission.

In NR RLC polling is defined in 38.322 V15.0.0 (2017-12) such that a transmitting side of the RLC entity shall include a poll, i.e. requesting status information of received one or more AMD PDUs, in an RLC PDUs fulfilling criteria as:

PDU_WITHOUT_POLL >=pollPDU;
BYTE_WITHOUT_POLL >=pollByte;
Empty data buffer;
If no new RLC PDUs can be transmitted.

It is also stated that "Empty RLC buffer (excluding transmitted RLC SDUs or RLC SDU segments awaiting acknowledgements) should not lead to unnecessary polling when data awaits in the upper layer. Details are left up to UE implementation.".

SUMMARY

For cases where PDCP suddenly turns off transmission to one RLC entity out of at least two RLC entities, the one RLC entity may have emptied its buffer but failed to include a poll with the last RLC PDU because at the time the RLC PDU was sent, the upper layer had data pending for this RLC entity.

In such situations when no poll was sent, the RLC entity may have RLC PDUs awaiting acknowledgement but since no poll for status is sent, these PDUs will not be acknowledged for a long time and the transmitting RLC entity will not know if the data was received by the receiving RLC entity or not. When this RLC entity is re-used for transmission again, then finally polls will be sent and when the old RLC PDU sequence numbers (SN) are acknowledged, the implicit acknowledge sent to PDCP layer may cause those acknowledgements to be outside the PDCP acknowledge window. It is even possible that the old unacknowledged RLC PDUs require retransmission and when received by RLC and PDCP entities, these may cause the PDCP receiver to receive packet out of RX window or cause Hyper Frame Number (HFN) desynchronization.

There is no handling of this problem in the current 3GPP specifications (36.322, 38.322 etc).

TS 38.322 v15.0.0:

"Upon notification of a transmission opportunity by lower layer, for each AMD PDU submitted for transmission, the transmitting side of an AM RLC entity shall:

if both the transmission buffer and the retransmission buffer becomes empty (excluding transmitted RLC SDUs or RLC SDU segments awaiting acknowledgements) after the transmission of the AMD PDU; or if no new RLC SDU can be transmitted after the transmission of the AMD PDU (e.g. due to window stalling);

include a poll in the AMD PDU as described below.

NOTE: Empty RLC buffer (excluding transmitted RLC SDUs or RLC SDU segments awaiting acknowledgements) should not lead to unnecessary polling when data awaits in the upper layer. Details are left up to UE implementation."

An object herein is to provide a mechanism to enable communication in an efficient manner in a wireless communications network.

According to an aspect the object is achieved, according to embodiments herein, by providing a method performed by a transmitting device, such as a radio network node or a wireless device, for handling communication in a wireless communications network. The transmitting device comprises at least two RLC entities and is configured with a split bearer to a receiving device. The transmitting device identifies that a last transmitted PDU, e.g. RLC PDU, of one of the at least two RLC entities, is lacking a poll or poll indicator. The poll or poll indicator requests a status of one or more transmitted PDUs. The transmitting device, when identifying that the last transmitted PDU lacks the poll indicator, transmits to the receiving device, a PDU comprising the poll indicator e.g. transmitting a new or another PDU with the poll indicator or retransmitting the same PDU with the poll indicator.

According to another aspect the object is achieved, according to embodiments herein, by providing a transmitting device for handling communication in a wireless communications network. The transmitting device comprises at least two RLC entities and is configured with a split bearer to a receiving device. The transmitting device is configured to identify that a last transmitted PDU, e.g. RLC PDU, of one of the at least two RLC entities, is lacking a poll or poll indicator. The poll or poll indicator requests a status of one or more transmitted PDUs. The transmitting device, when identifying that the last transmitted PDU lacks the poll indicator, is further configured to transmit to the receiving device, a PDU comprising a poll indicator e.g. transmitting a new or another PDU with the poll indicator or retransmitting the same PDU with the poll indicator.

It is furthermore provided herein a computer program product comprising instructions, which, when executed on at least one processor, cause the at least one processor to carry out the method above, as performed by the transmitting device. It is additionally provided herein a computer-readable storage medium, having stored thereon a computer program product comprising instructions which, when executed on at least one processor, cause the at least one processor to carry out the method according to the method above, as performed by the transmitting device.

Embodiments herein are applicable for protocol architectures where a higher layer PDCP entity is associated with multiple lower layer RLC entities. These include e.g.:

Dual Connectivity Split bearers and applies to when the transmission on the RLC entities are changed, leading to data not being available anymore for the old RLC entity.

Dual Connectivity Split bearers and applies to when a splitting threshold is configured and buffered data changes from more than the threshold to less than the threshold, leading to data not being available anymore for the secondary associated RLC.

Dual Connectivity or carrier aggregation protocol architecture where duplication is configured and duplication becomes deactivated, leading to data not being available anymore for the secondary associated RLC (where previously duplicates were sent).

According to some embodiments herein the transmitting device may:

identify when the last RLC PDU sent on a transmitting RLC entity before a RLC entity switch or PDCP duplication deactivation or data below split threshold does not include a poll indicator i.e. an indication of a poll requested;

and if not, secure that a poll is set for the last RLC PDU in the transmission on this RLC entity. E.g.

allow a new RLC PDU for transmission, which naturally empties the queue and includes the poll indicator, or retransmission of last RLC PDU, now including the poll indicator.

The first RLC entity will after this be ready for re-use at some later point if traffic is activated in this RLC entity again.

The delay of the RLC acknowledgement due to a missing poll on the last PDU may cause reduced performance:

As the unacknowledged PDCP PDUs are retransmitted to the other RLC entity and therefore load its air interface. This even though they have already been correctly received by the receiving device on the first RLC entity.

If a leg, i.e. a link, for which unacknowledged data still exists, is started to be used again, possible after several seconds, this will result in the acknowledgement of RLC PDU(s) in a RLC Status Report (as new RLC PDU transmissions will include a poll), and their corresponding PDCP PDU SN acknowledged and sent in the DL Data Delivery Status frame to the CU, may be too old and therefore cause a wraparound fault in PDCP.

If a leg for which unacknowledged data still exists, is started to be used again, possible after several seconds, this may result in the negative acknowledgement of old RLC PDU(s) in a RLC Status Report (as new RLC PDU transmissions will include a poll). The non-acknowledged (NACK) RLC PDUs will then be retransmitted by the RLC transmitter and when correctly received by the RLC receiver, the corresponding PDCP PDUs will be forwarded to the PDCP entity. These very old PDCP PDUs which are received by the PDCP receiver may cause wraparound faults in the PDCP receiver, which in worse case may lead to that the PDCP HFN is incorrectly stepped at the PDCP receiver side, which may cause complete failure for the current DRB due to failure to perform deciphering of packets.

Furthermore, not including a poll bit, i.e. poll indicator, according to embodiments herein, would lead to the receiver being unclear on whether a status report should be issued or not. Either no status report is sent, leading to above disadvantages, or always sending status reports in order to mitigate the un-clarity. Always sending status reports in this case leads to additional overhead. Therefore, correctly sending a poll indicator, such as a poll bit according to embodiments herein, provides an efficient solution assuring acknowledgment of transmitted PDUs.

BRIEF DESCRIPTION OF THE DRAWINGS

Embodiments will now be described in more detail in relation to the enclosed drawings, in which.

DETAILED DESCRIPTION

Embodiments herein are described within the context of 3GPP NR radio technology (3GPP TS 38.300 V15.0.0 (2017-12)). It should be understood that the problems and solutions described herein are equally applicable to wireless access networks and user-equipments (UEs) implementing other access technologies and standards. NR is used as an example technology suitable, and using NR in the description therefore is particularly useful for understanding the problem and solutions solving the problem. In particular, embodiments herein are also applicable to 3GPP LTE, or 3GPP LTE and NR integration, also denoted as non-standalone NR, or EN-DC (EUTRA-NR—dual connectivity).

Figure 1:
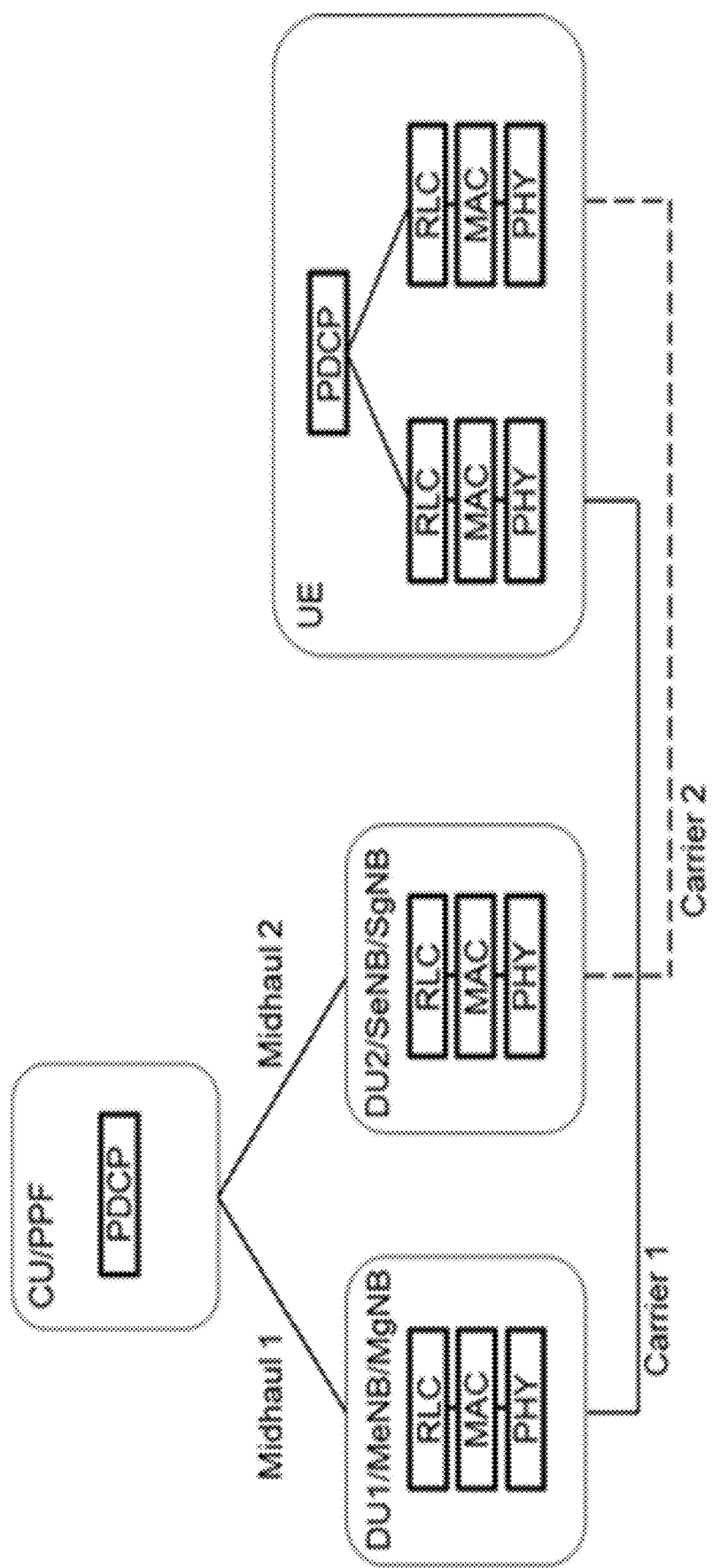
FIG. 1 shows block diagram depicting a dual connectivity architecture.
Figure 2:
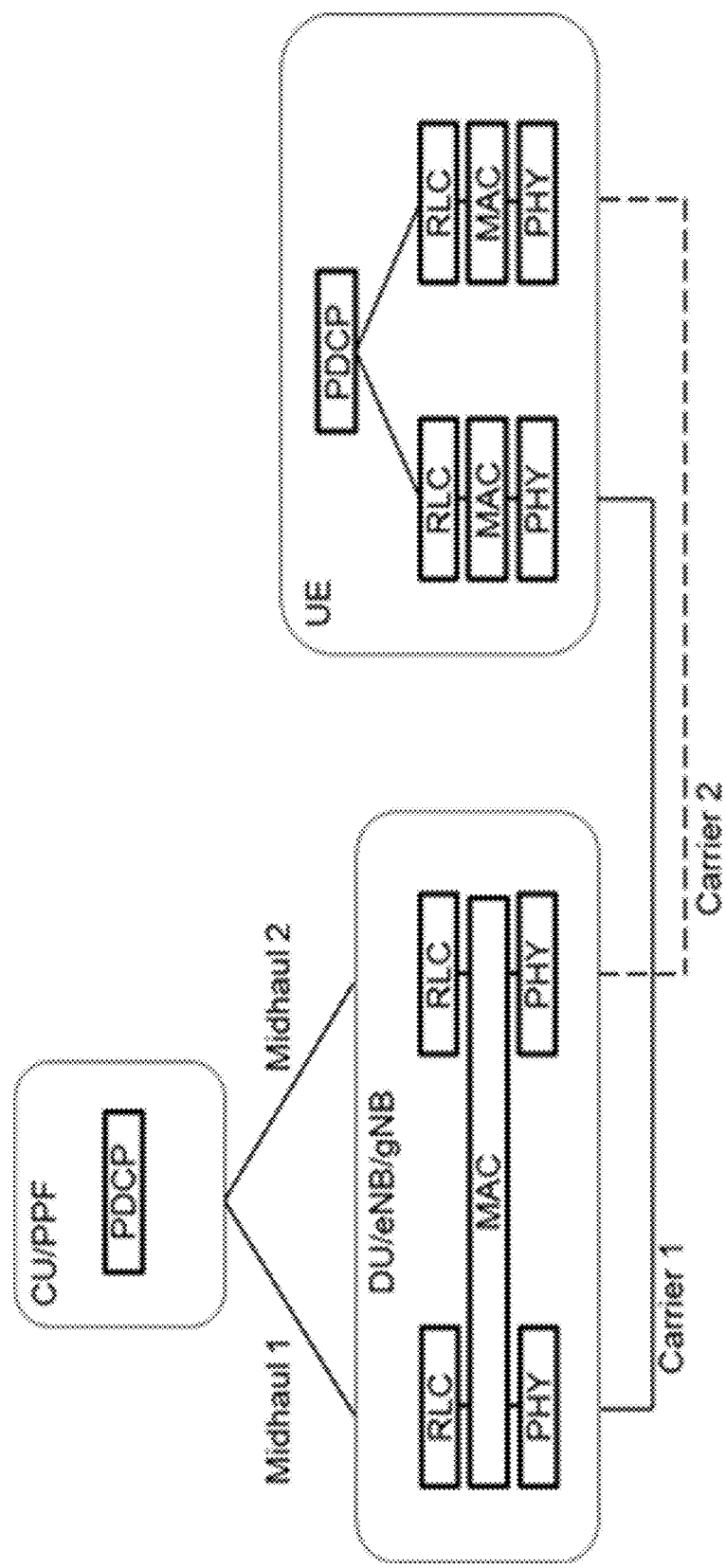
FIG. 2 shows a block diagram depicting a carrier aggregation architecture.
Figure 3:
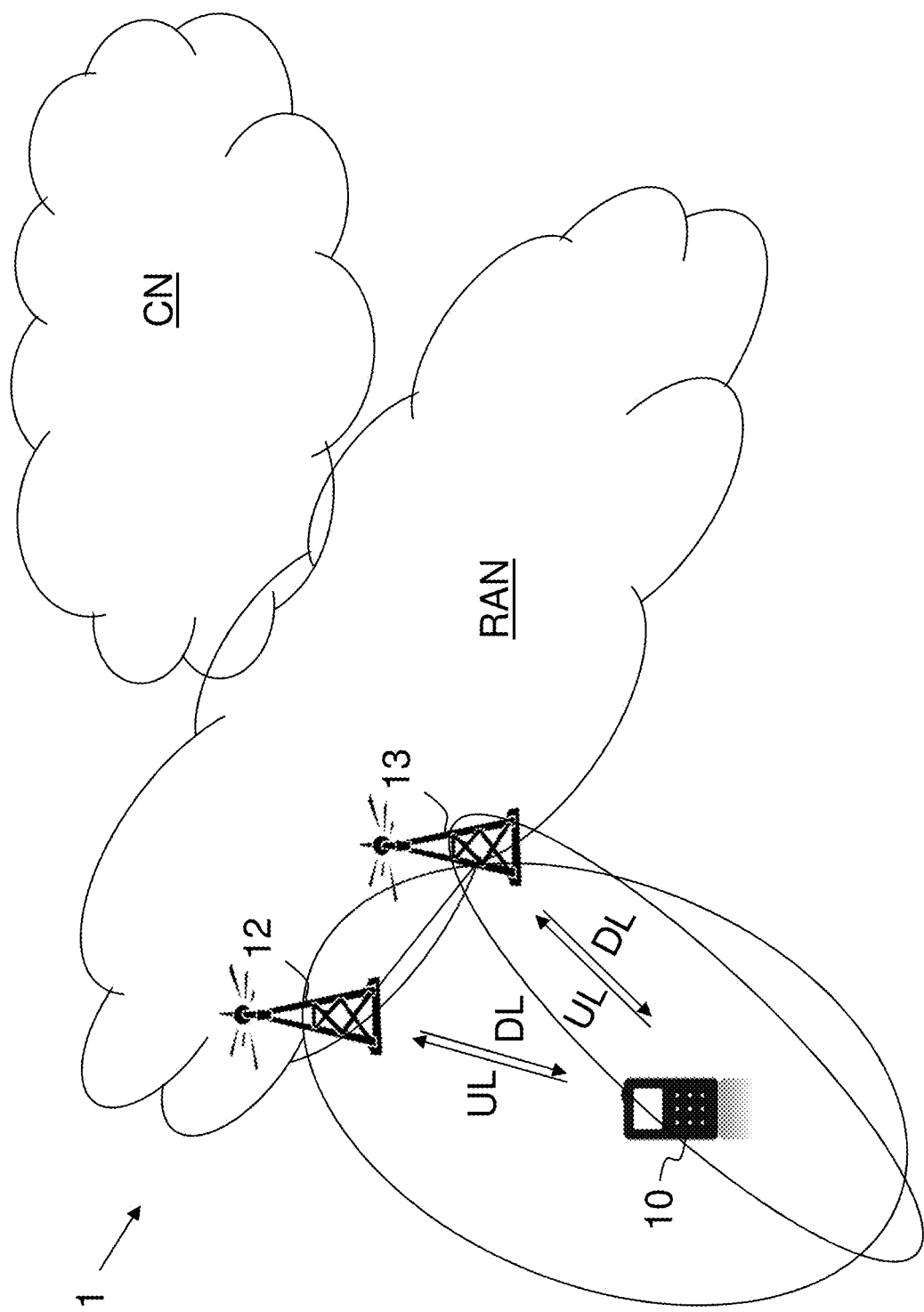
FIG. 3 is a schematic overview depicting a wireless communications network according to embodiments herein.

Embodiments herein relate to wireless communications networks in general. FIG. 3 is a schematic overview depicting a wireless communications network 1. The wireless communications network 1 comprises one or more RANs and one or more CNs. The wireless communications network 1 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 1, a receiving device 100 exemplified herein as a wireless device 10 such as a mobile station, a non-access point (non-AP) STA, a STA, a user equipment and/or a wireless terminal, is comprised communicating via e.g. one or more Access Networks (AN), e.g. RAN, to one or more core networks (CN). It should be understood by the skilled in the art that "wireless device" is a non-limiting term which means any terminal, wireless communications terminal, user equipment, NB-IoT device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communications network 1 comprises a transmitting device 120 such as a first radio network node 12 providing radio coverage over a geographical area, a first service area, of a first radio access technology (RAT), such as NR, LTE, or similar. The first radio network node may be a transmission and reception point such as an access node, an access controller, a base station, e.g. a radio base station such as a gNodeB (gNB), an evolved Node B (eNB, eNode B), a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node depending e.g. on the first radio access technology and terminology used. The radio network node may be referred to as a serving radio network node wherein the service area may be referred to as a serving cell, and the serving network node communicates with the wireless device in form of DL transmissions to the wireless device and UL transmissions from the wireless device. It should be noted that a service area may be denoted as cell, beam, beam group or similar to define an area of radio coverage. Furthermore is a second radio network node 13 comprised in the wireless communication network for supporting a split bearer and may comprise one RLC entity out of the two RLC entities of the split bearer. The second radio network node may be a transmission and reception point such as an access node, an access controller, a base station, e.g. a radio base station such as a gNodeB (gNB), an evolved Node B (eNB, eNode B), a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the second radio network node depending e.g. on a second radio access technology and terminology used. The second radio network node may be referred to as a secondary serving radio network node wherein the service area may be referred to as a secondary serving cell, and the second radio network node communicates with the wireless device in form of DL transmissions to the wireless device and UL transmissions from the wireless device.

The wireless device 10 is in the illustrated example the receiving device 100 and the first radio network node 12 or the second radio network node 13 is the transmitting device 120, however, it may be the other way around. Thus, the transmitting device 120 may be a radio network node or a wireless device. Furthermore, the radio network node may be one or more nodes such as one base station with two RLC entities or two base stations or even be a distributed node comprising two DUs plus one CU.

According to embodiments herein wherein the transmitting device 120 is configured for transmitting e.g. PCDP PDUs over at least two RLC entities e.g. in the case of using split bearers e.g. in a dual connectivity architecture or a carrier aggregation architecture.

At e.g. some events, the transmitting device 120 identifies if the last transmitted PDU, such as a RLC PDU on one RLC entity, includes an indication of a poll or not of one RLC entity. The poll is requesting status of transmitted one or more PDUs, wherein status means received and/or decoded or not. Examples of these events are such that the transmission on one or more of the RLC entities are stopped or switched to other RLC entities while data still awaits in higher layers associated to the RLC entity.

From the perspective of one RLC entity these events entail that data in a higher layer transmit buffer becomes unavailable.

The reason why the last transmitted PDU may not include a poll indicator is that the PDU is created before the action of the some events takes effect. The event can be any of below:

- reconfiguration from transmission on one RLC entity to another on uplink. This is based on radio resource control (RRC) Connection Reconfiguration signaling to the UE changing the PDCP-config parameter DataSplitDRB-ViaSCG
- reconfiguration transmission from many RLC entities to less on uplink. This can be:
  - due to RRC Connection Reconfiguration signaling to the UE changing the PDCP-config parameter DataSplitThreshold
  - caused by UE transmission and that the UE buffer size becomes lower than configured PDCP-config parameter DataSplitThreshold.
- for a split bearer configured with a DataSplitThreshold, buffered data becoming less than the split threshold, the data not being available anymore for a secondary RLC entity.
- deactivation of UL or DL PDCP duplication using applicable signaling as media access control (MAC) control element (CE) or RRC.
- downlink data transmission is stopped on one of the RLC entities while data still await in higher layers. This applies when DL Data PDU frame includes a DL Flush or DL Discard Block message and unsent PDUs are discarded.

If it is identified, based on above, that the last transmitted PDU does not include a poll, the embodiments herein secure or enable that the transmitting device 120 and the receiving device 100 have the same view on which PDUs that have been transmitted and successfully acknowledged. The alternatives to secure this are at least the following:

allow transmission of a new RLC PDU, now including a poll indicator. This means that after the trigger to stop using an RLC entity, still allow one additional PDCP PDU to be sent to this RLC entity for transmission. When the corresponding RLC PDU is sent emptying the RLC buffer, it will be a natural trigger to send a poll indicator.

transmit a dummy RLC PDU including a poll indicator. The payload can be any data or no data but with the poll indicator.

retransmit the last transmitted RLC PDU, now including poll indicator.

When any of above alternatives has been successfully completed, it is possible to at any later time perform further transmissions on the RLC entity.

In one embodiment, the poll, also referred to as poll indicator or poll bit, is set on RLC when the upper layer transmit buffer from RLC perspective becomes empty for this RLC entity. This includes the case where the upper layer transmit buffer, i.e. PDCP buffer, is not empty, but that transmission of this data is not allowed (anymore) on this RLC entity. In other words, the poll indicator is set when no further upper layer transmit buffer data is available for transmission in this RLC entity.

In another embodiment, the poll indicator is set on RLC, by explicit indication e.g. when being re-configured to switch the UL, deactivate splitting, or deactivate duplication.

In a further embodiment, whether the methods described herein are applicable, is configured by RRC for e.g. the UE.

Implementation in specification 3GPP TS 38.322 V.15.0.

Two alternative changes to implement into the standard are underlined

Alternative 1:

Upon notification of a transmission opportunity by lower layer, for each acknowledged Mode Data (AMD) PDU submitted for transmission, the transmitting side of an acknowledged mode (AM) RLC entity shall:

if both the transmission buffer and the retransmission buffer becomes empty (excluding transmitted RLC SDUs or RLC SDU segments awaiting acknowledgements) after the transmission of the AMD PDU; or if no new RLC SDU can be transmitted after the transmission of the AMD PDU (e.g. due to window stalling);

include a poll in the AMD PDU as described below.

The UE considers as transmission buffer also data awaiting in upper layer allowed for transmission on this RLC entity. When data on upper layer is not allowed for transmission on this RLC entity (anymore), the transmission buffer on upper layer is considered empty (and thus include a poll in the AMD PDU).

NOTE: Empty RLC buffer (excluding transmitted RLC SDUs or RLC SDU segments awaiting acknowledgements) should not lead to unnecessary polling when data awaits in the upper layer. Details are left up to UE implementation.

Alternative 2:

Upon assembly of an AMD PDU or AMD PDU segment, the transmitting side of an AM RLC entity shall:

if both the transmission buffer and the retransmission buffer becomes empty (excluding transmitted RLC data PDU awaiting for acknowledgements) after the transmission of the RLC data PDU; or if no new RLC data PDU can be transmitted after the transmission of the RLC data PDU (e.g. due to window stalling);

if upper layers become empty (e.g. due to actions as deactivation of packet data duplication, change of RLC entity and DL Flush)

include a poll in the RLC data PDU as described below.

NOTE: Empty RLC buffer (excluding transmitted RLC data PDU awaiting for acknowledgements) should not lead to unnecessary polling when data awaits in the upper layer. Details are left up to UE implementation.

Figure 4:
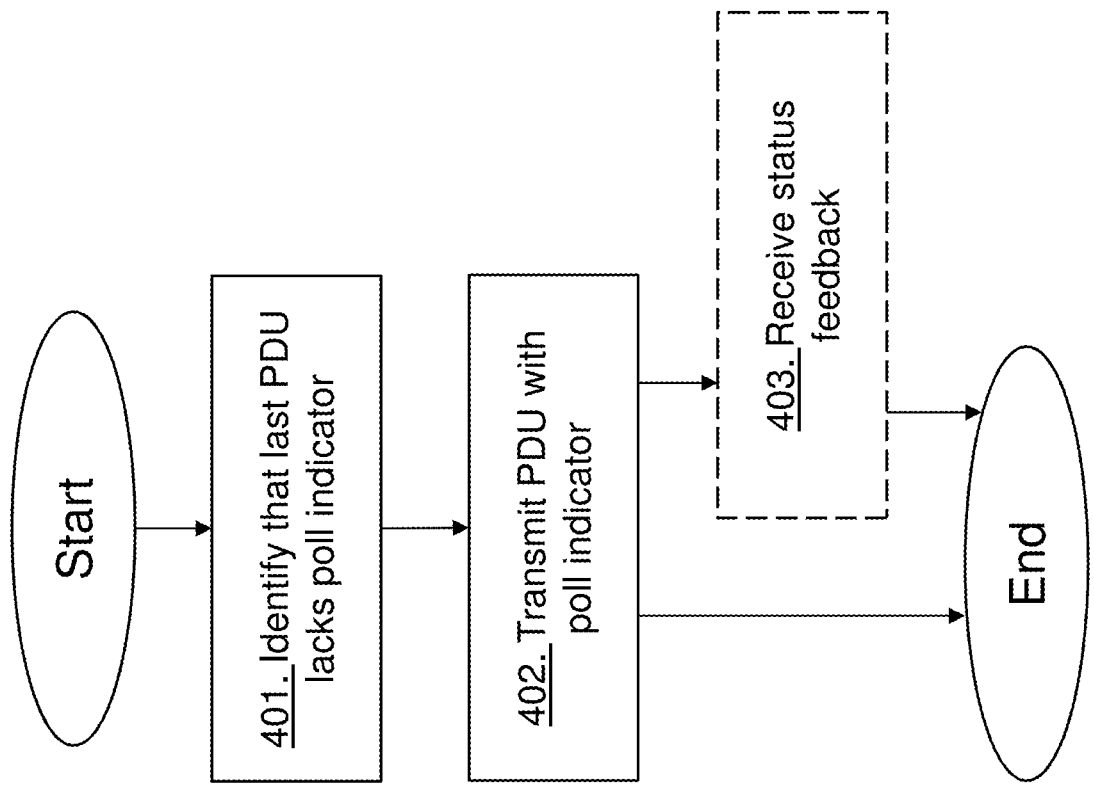
FIG. 4 shows a schematic flowchart depicting a method performed by a transmitting device according to embodiments herein.

The method actions performed by the transmitting device 120 for handling communication, e.g. handling data in PDUs to the receiving device 100, in the wireless communications network 1 according to embodiments will now be described with reference to a flowchart depicted in FIG. 4. The actions do not have to be taken in the order stated below, but may be taken in any suitable order. Actions performed in some embodiments are marked with dashed boxes. The transmitting device 120 comprises at least two RLC entities and is configured with a split bearer to the receiving device 100. The method may be for transmitting PDCP PDUs to the receiving device 10 over a split bearer e.g. over multiple RLC entities.

Action 401. The transmitting device 120 identifies that the last transmitted PDU, of one of the at least two RLC entities, is lacking a poll indicator requesting the status of one or more transmitted PDUs. E.g. it is not related all PDUs on the split bearer, it is related to each RLC entity individually. The transmitting device may identify that the last transmitted PDU is lacking the poll indicator in the event that transmission on one or more of the at least two RLC entities is stopped or switched to another RLC entity while data still awaits in higher layers associated to a first RLC entity.

Action 402. The transmitting device 120 transmits to the receiving device 100, when identifying that the last transmitted PDU lacks the poll indicator, the PDU comprising a poll indicator, such as an RLC PDU with the poll. The PDU comprising the poll indicator may be another PDU with the poll indicator or the same PDU as the last transmitting PDU retransmitted with the poll indicator. The PDU comprising the poll indicator may be transmitted when no further upper layer transmit buffer data is available for transmission in a corresponding RLC entity, or when being re-configured to switch uplink, deactivate splitting, or deactivate duplication. The PDU comprising the poll indicator may be transmitted when upper layers, of a corresponding RLC entity, become empty of packets. E.g. if upper layers become empty, e.g. due to actions as deactivation of packet data duplication, change of RLC entity and DL Flush, the transmitting device 120 may transmit the PDU with the poll indicator.

Action 403. The transmitting device 120 may receive status feedback from the receiving device 100 such as ACK or NACK.

Figure 5:
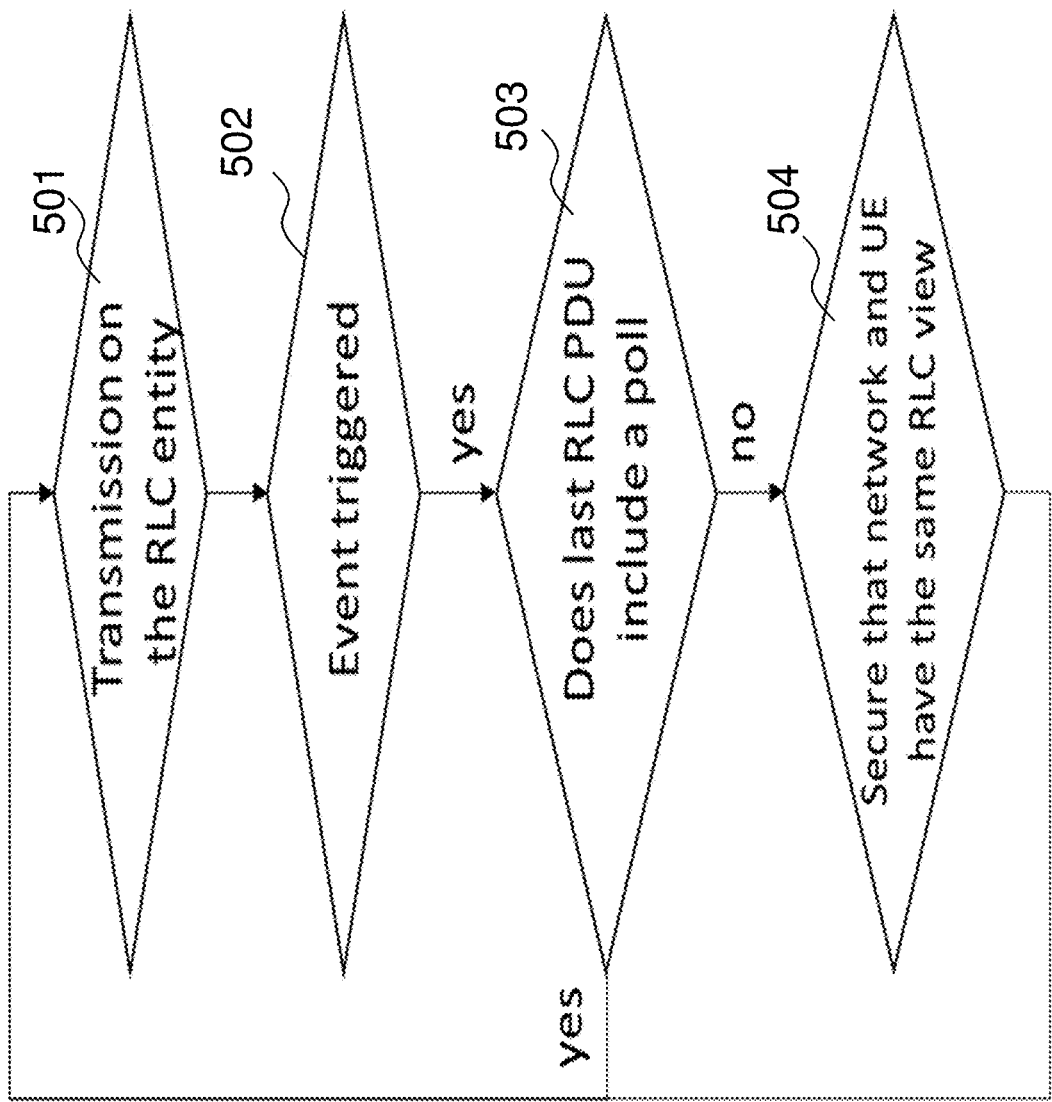
FIG. 5 shows a schematic flowchart depicting a method performed by a transmitting device according to embodiments herein.

FIG. 5 is a schematic flowchart depicting a method according to some embodiments herein.

Action 501. The transmitting device 120 may perform a transmission on the RLC entity or entities.

Action 502. An event triggers the execution of embodiments herein. E.g:

reconfiguration from transmission on one RLC entity to another on uplink. This is based on RRC Connection Reconfiguration signaling to the receiving device changing the PDCP-config parameter DataSplitDRB-ViaSCG reconfiguration transmission from many RLC entities to less on uplink. This can be:

due to RRC Connection Reconfiguration signaling to the receiving device changing the PDCP-config parameter DataSplitThreshold caused by receiving device transmission and that the receiving device buffer size becomes lower than configured PDCP-config parameter DataSplit-Threshold.

for a split bearer configured with a DataSplitThreshold, buffered data becoming less than the split threshold, the data not being available anymore for a secondary RLC entity.

deactivation of UL or DL PDCP duplication using applicable signaling as MAC CE or RRC.

downlink (DL) data transmission is stopped on one of the RLC entities while data still await in higher layers. This applies when DL Data PDU frame includes a DL Flush or DL Discard Block message and unsent PDUs are discarded.

Action 503. The transmitting device 120 identifies whether the last RLC PDU includes the poll indicator or not.

Action 504. The transmitting device 120 secures that the transmitting device, such as the network node, and the receiving device 100, such as a UE, have the same RLC view. Thus, the transmitting device 120 transmits a PDU, another or the previous one, with the poll indicator.

Figure 6:
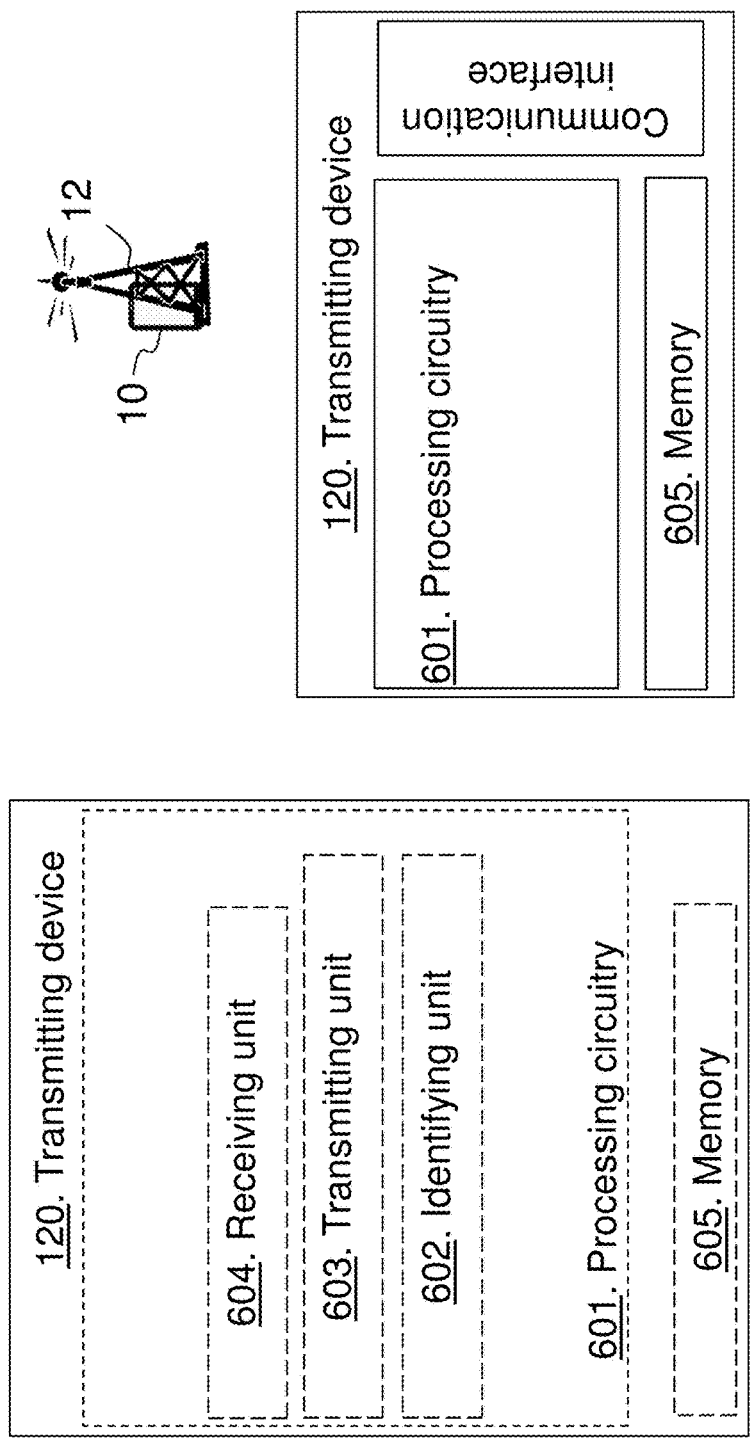
FIG. 6 is a block diagram depicting a transmitting device according to embodiments herein.
Figure 6:
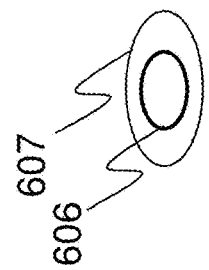

FIG. 6 is a block diagram depicting the transmitting device 120, such as the radio network node 12 or the wireless device 10 for handling communication in the wireless communications network according to embodiments herein. The transmitting device 120 comprises at least two RLC entities and is configured with a split bearer to the receiving device 100.

The transmitting device 120 may comprise processing circuitry 601, e.g. one or more processors, configured to perform the methods herein.

The transmitting device 120 comprises an identifying unit 602. The transmitting device 120, the processing circuitry 601, and/or the identifying unit 602 is configured to identify that the last transmitted PDU is lacking the poll indicator requesting the status of the one or more transmitted PDUs. The transmitting device 120, the processing circuitry 601, and/or the identifying unit 602 may be configured to identify that the last transmitted PDU, of one of the at least two RLC entities, is lacking the poll indicator in the event that transmission on one or more of the at least two RLC entities is stopped or switched to another RLC entity while data still awaits in higher layers associated to a first RLC entity.

The transmitting device 120 further comprises a transmitting unit 603, e.g. a transmitter or a transceiver or a module. The transmitting device 120, the processing circuitry 601, and/or the transmitting unit 603 is configured, when identifying that the last transmitted PDU lacks the poll indicator, to transmit to the receiving device 100, the PDU such as the RLC PDU, comprising the poll indicator e.g. a poll bit. The PDU comprising the poll indicator may be another PDU with the poll indicator or the same PDU as the last transmitting PDU retransmitted with the poll indicator. The transmitting device 120, the processing circuitry 601, and/or the transmitting unit 603 may be configured to transmit the PDU comprising the poll indicator when no further upper layer transmit buffer data is available for transmission in a corresponding RLC entity, or when being re-configured to switch uplink, deactivate splitting, or deactivate duplication. The transmitting device 120, the processing circuitry 601, and/or the transmitting unit 603 may be configured to transmit the PDU comprising the poll indicator when upper layers, of a corresponding RLC entity, become empty of packets.

The transmitting device 120 may comprise a receiving unit 604, a receiver or a transceiver or a module. The transmitting device 120, the processing circuitry 601, and/or the receiving unit 604 may be configured to receive the status feedback such as ACK or NACK from the receiving device 100.

The transmitting device 120 further comprises a memory 605. The memory comprises one or more units to be used to store data on, such as signal strengths or qualities, polls indicators, PDU information, events, applications to perform the methods disclosed herein when being executed, and similar. Furthermore, the transmitting device 12 may comprise a communication interface such as comprising a transmitter, a receiver and/or a transceiver.

The methods according to the embodiments described herein for the transmitting device 120 are respectively implemented by means of e.g. a computer program product 606 or a computer program, comprising instructions, i.e., software code portions, which, when executed on at least one processor, cause the at least one processor to carry out the actions described herein, as performed by the transmitting device 120. The computer program product 606 may be stored on a computer-readable storage medium 607, e.g. a disc, a universal serial bus (USB) stick or similar. The computer-readable storage medium 607, having stored thereon the computer program product, may comprise the instructions which, when executed on at least one processor, cause the at least one processor to carry out the actions described herein, as performed by the transmitting device 120. In some embodiments, the computer-readable storage medium may be a transitory or a non-transitory computer-readable storage medium. Thus, embodiments herein may disclose a transmitting device for handling communication to the receiving device in a wireless communications network, wherein the transmitting device comprises processing circuitry and a memory, said memory comprising instructions executable by said processing circuitry whereby said transmitting device is operative to to perform any of the methods herein.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Figure 7:
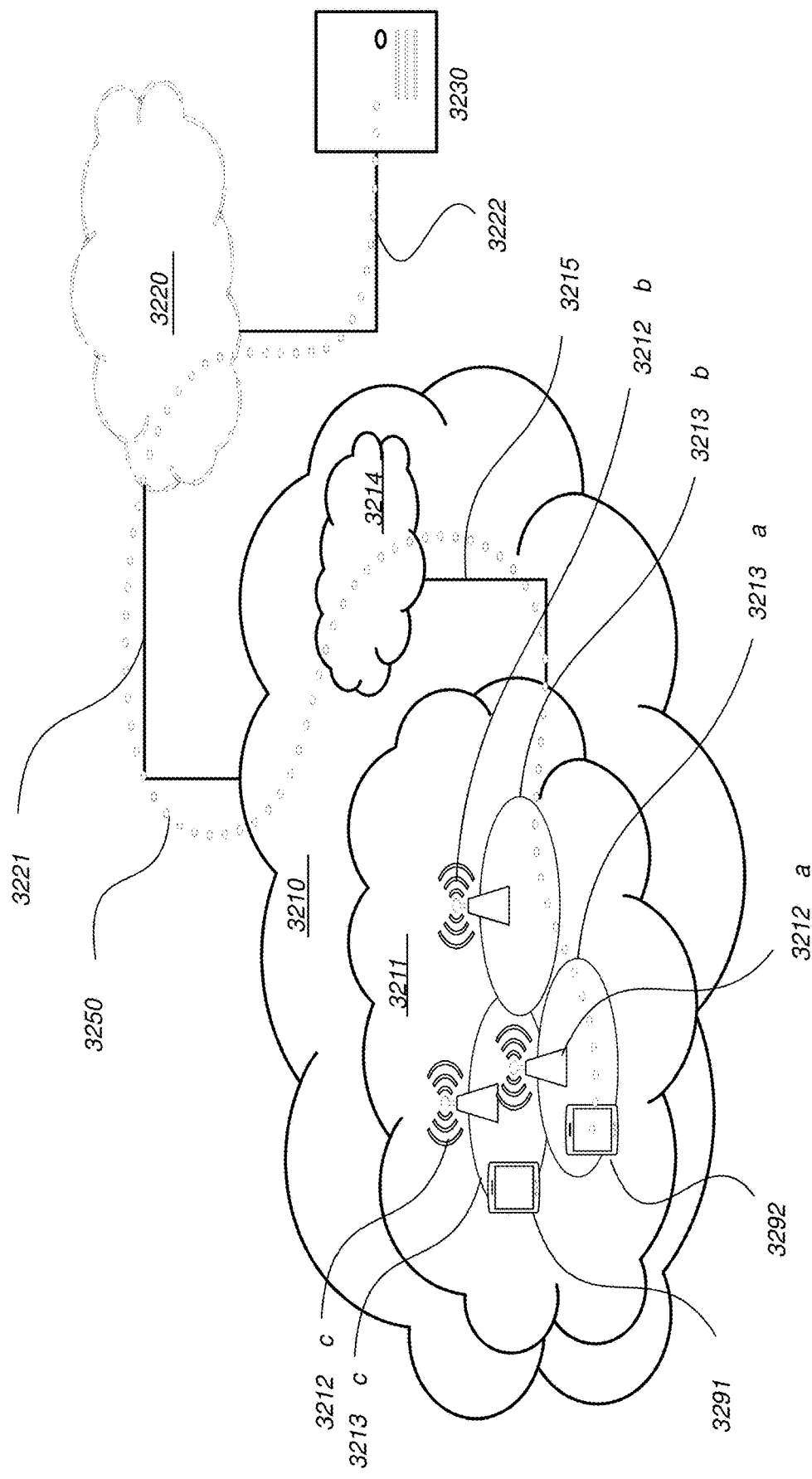
FIG. 7 shows a telecommunication network connected via an intermediate network to a host computer in accordance with some embodiments.

FIG. 7 shows a Telecommunication network connected via an intermediate network to a host computer in accordance with some embodiments. With reference to FIG. 7, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points being examples of the radio network node 12 above, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example being examples of the wireless device 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 7 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 8:
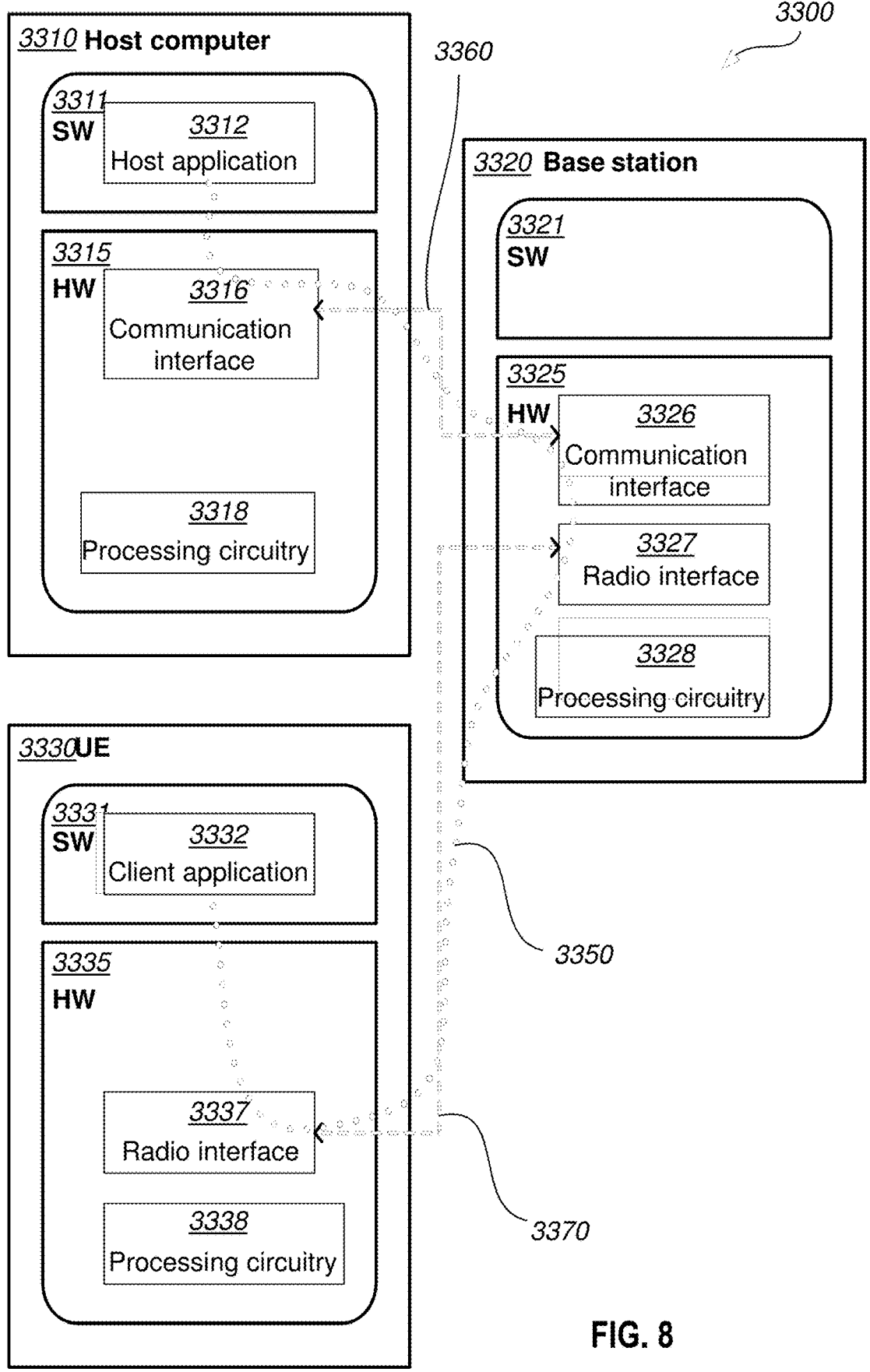
FIG. 8 shows a host computer communicating via a base station with a user equipment over a partially wireless connection in accordance with some embodiments.

FIG. 8: Host computer communicating via a base station with a user equipment over a partially wireless connection in accordance with some embodiments Example implementations, in accordance with an embodiment, of the UE, base station and host computer discussed in the preceding paragraphs will now be described with reference to FIG. 8. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 8) served by base station 3320. Communication interface 3326 may be configured to facilitate connection 3360 to host computer 3310. Connection 3360 may be direct or it may pass through a core network (not shown in FIG. 8) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338.

Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 8 may be similar or identical to host computer 3230, one of base stations 3212a, 3212b, 3212c and one of UEs 3291, 3292 of FIG. 7, respectively. This is to say, the inner workings of these entities may be as shown in FIG. 8 and independently, the surrounding network topology may be that of FIG. 7.

In FIG. 8, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency since the PDUs are confirmed received or not much quicker and thus resources may be used in a more efficient manner and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figures 9, 10:
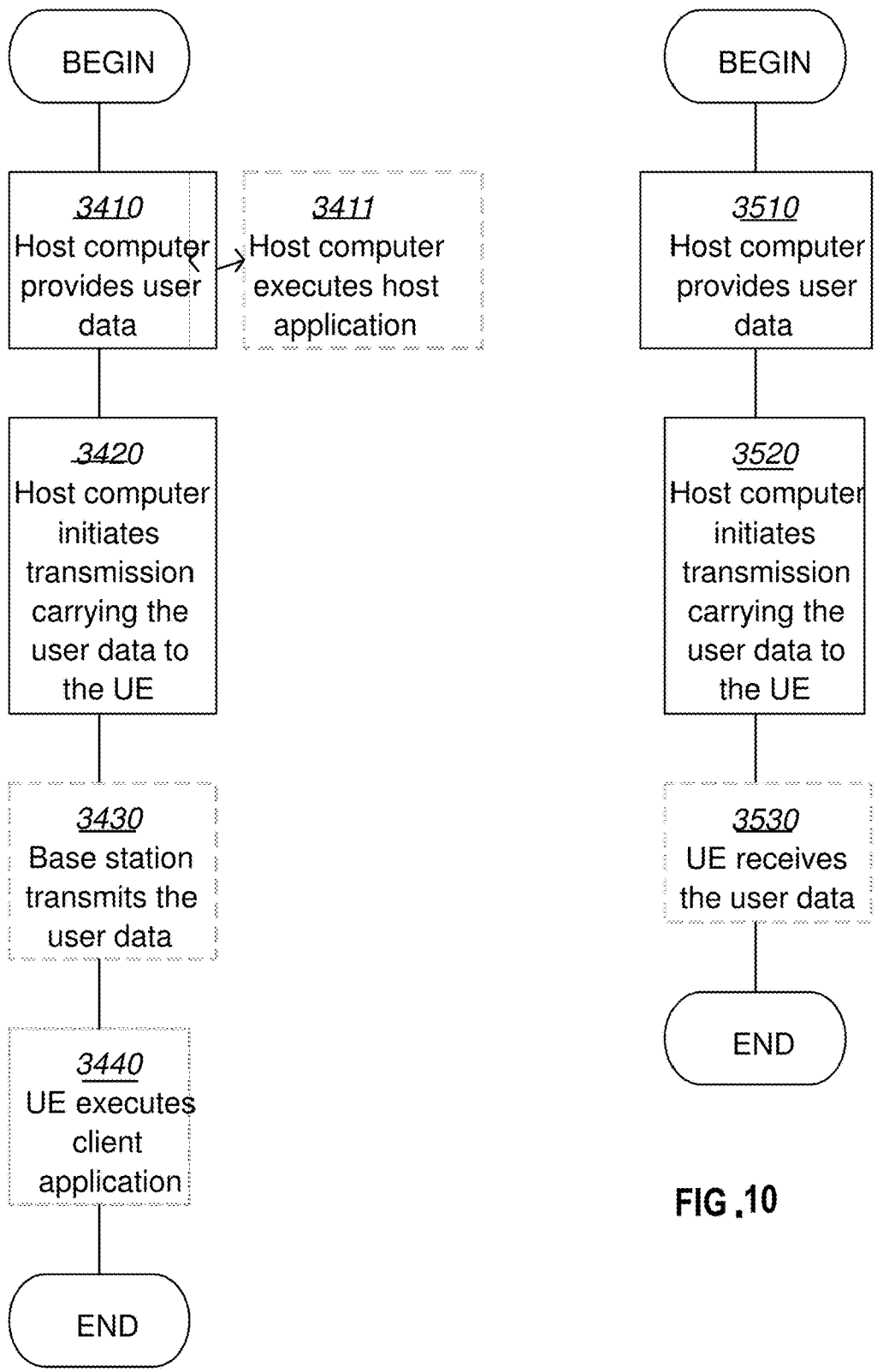
FIG. 9 shows methods implemented in a communication system including a host computer, a base station and a user equipment in accordance with some embodiments.
FIG. 10 shows methods implemented in a communication system including a host computer, a base station and a user equipment in accordance with some embodiments.

FIG. 9: Methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 10: Methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figures 11, 12:
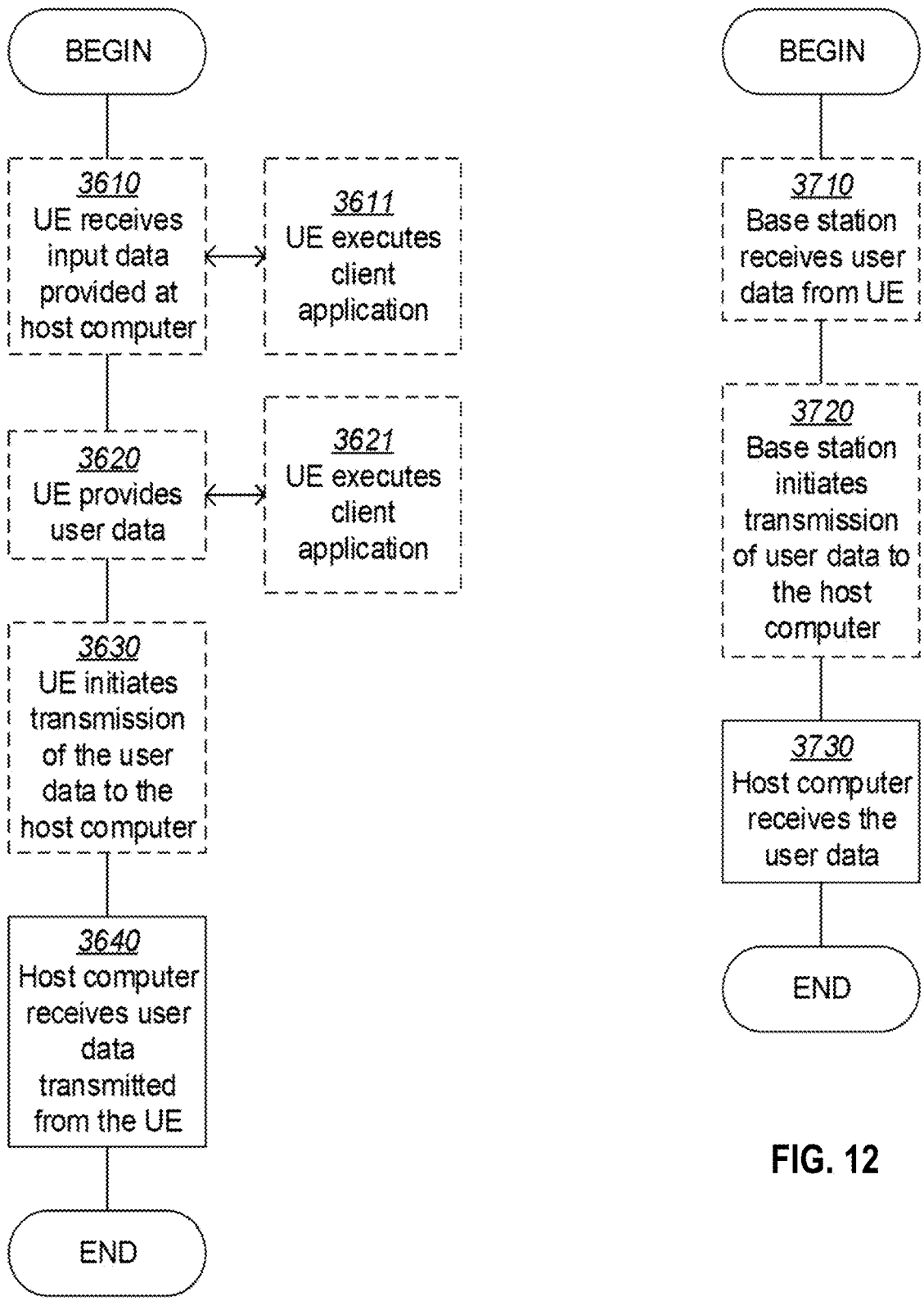
FIG. 11 shows methods implemented in a communication system including a host computer, a base station and a user equipment in accordance with some embodiments.
FIG. 12 shows methods implemented in a communication system including a host computer, a base station and a user equipment in accordance with some embodiments.

FIG. 11: Methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 12: Methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATION EXPLANATION

3GPP 3rd Generation Partnership Project
DL Downlink
DCI Downlink control information
DRX Discontinuous Reception
DTX Discontinuous Transmission
eDRX extended Discontinuous Reception
eMTC enhanced Machine-Type Communications
eNB Evolved NodeB
PDU Protocol Data Unit
RRC Radio Resource Control (protocol)
SI System Information
SF Subframe
SN Sequence number
UE User Equipment
UL Uplink
WI Work Item

The invention claimed is:

1. A method performed by a transmitting device for handling communication in a wireless communications network, wherein the transmitting device comprises at least two radio link control, RLC, entities and is configured with a split bearer to a receiving device, the method comprising:
responsive to occurrence of an event, identifying that a protocol data unit (PDU) last transmitted on one of the at least two RLC entities before occurrence of the event lacks a poll indicator requesting a status of one or more transmitted PDUs, wherein the event is:
stopping of transmission on one or more of the at least two RLC entities while data still awaits in higher layers associated to a first RLC entity;
transmission on one or more of the at least two RLC entities is switched to another RLC entity while data still awaits in higher layers associated to a first RLC entity;
no further upper layer transmit buffer data is available for transmission in a corresponding RLC entity;
re-configuration to deactivate splitting or deactivate duplication; or
upper layers, of a corresponding RLC entity, become empty of packets; and
responsive to identifying that the PDU last transmitted lacks the poll indicator, transmitting, to the receiving device, a PDU comprising a poll indicator.

2. The method according to claim 1, wherein the PDU comprising the poll indicator is another PDU with the poll indicator or the same PDU as the PDU last transmitted retransmitted with the poll indicator.

3. The method according to claim 1, wherein the event is stopping of transmission on one or more of the at least two RLC entities while data still awaits in higher layers associated to a first RLC entity.

4. The method according to claim 1, wherein the event is transmission on one or more of the at least two RLC entities is switched to another RLC entity while data still awaits in higher layers associated to a first RLC entity.

5. The method according to claim 1, wherein the event is no further upper layer transmit buffer data is available for transmission in a corresponding RLC entity.

6. The method according to claim 1, wherein the event is re-configuration to deactivate splitting or deactivate duplication.

7. The method according to claim 1, wherein the event is upper layers, of a corresponding RLC entity, become empty of packets.

8. A transmitting device for handling communication in a wireless communications network, wherein the transmitting device comprises:
processing circuitry configured to:
responsive to occurrence of an event, identify that a protocol data unit (PDU) last transmitted on one of at least two radio link control (RLC) entities of the transmitting device before occurrence of the event lacks a poll indicator requesting a status of one or more transmitted PDUs, wherein the event is:
stopping of transmission on one or more of the at least two RLC entities while data still awaits in higher layers associated to a first RLC entity;
transmission on one or more of the at least two RLC entities is switched to another RLC entity while data still awaits in higher layers associated to a first RLC entity;
no further upper layer transmit buffer data is available for transmission in a corresponding RLC entity;
re-configuration to deactivate splitting or deactivate duplication; or
upper layers, of a corresponding RLC entity, become empty of packets; and
responsive to identifying that the PDU last transmitted lacks the poll indicator, transmit, to a receiving device to which the transmitting device is configured with a split bearer, a PDU comprising a poll indicator.

9. The transmitting device according to claim 8, wherein the PDU comprising the poll indicator is another PDU with the poll indicator or the same PDU as the PDU last transmitted retransmitted with the poll indicator.

10. The transmitting device according to claim 8, wherein the event is stopping of transmission on one or more of the at least two RLC entities while data still awaits in higher layers associated to a first RLC entity.

11. The transmitting device according to claim 8, wherein the event is transmission on one or more of the at least two RLC entities is switched to another RLC entity while data still awaits in higher layers associated to a first RLC entity.

12. The transmitting device according to claim 8, wherein the event is no further upper layer transmit buffer data is available for transmission in a corresponding RLC entity.

13. The transmitting device according to claim 8, wherein the event is re-configuration to deactivate splitting or deactivate duplication.

14. The transmitting device according to claim 8, wherein the event is upper layers, of a corresponding RLC entity, become empty of packets.

15. A non-transitory computer-readable storage medium having stored thereon a computer program product comprising instructions which, when executed on at least one processor of a transmitting device, cause the at least one processor to:
responsive to occurrence of an event, identify that a protocol data unit (PDU) last transmitted on one of at least two radio link control (RLC) entities of the transmitting device before occurrence of the event lacks a poll indicator requesting a status of one or more transmitted PDUs, wherein the event is:
stopping of transmission on one or more of the at least two RLC entities while data still awaits in higher layers associated to a first RLC entity;
transmission on one or more of the at least two RLC entities is switched to another RLC entity while data still awaits in higher layers associated to a first RLC entity;
no further upper layer transmit buffer data is available for transmission in a corresponding RLC entity;
re-configuration to deactivate splitting or deactivate duplication; or
upper layers, of a corresponding RLC entity, become empty of packets; and
responsive to identifying that the PDU last transmitted lacks the poll indicator, transmit, to a receiving device to which the transmitting device is configured with a split bearer, a PDU comprising a poll indicator.

16. The non-transitory computer-readable storage medium according to claim 15, wherein the PDU comprising the poll indicator is another PDU with the poll indicator or the same PDU as the PDU last transmitted retransmitted with the poll indicator.

17. The non-transitory computer-readable storage medium according to claim 15, wherein the event is stopping of transmission on one or more of the at least two RLC entities while data still awaits in higher layers associated to a first RLC entity.

18. The non-transitory computer-readable storage medium according to claim 15, wherein the event is transmission on one or more of the at least two RLC entities is switched to another RLC entity while data still awaits in higher layers associated to a first RLC entity.

19. The non-transitory computer-readable storage medium according to claim 15, wherein the event is no further upper layer transmit buffer data is available for transmission in a corresponding RLC entity.

20. The non-transitory computer-readable storage medium according to claim 15, wherein the event is re-configuration to deactivate splitting or deactivate duplication.

21. The non-transitory computer-readable storage medium according to claim 15, wherein the event is upper layers, of a corresponding RLC entity, become empty of packets.

* * * * *

UNITED STATES PATENT AND TRADEMARK OFFICE
CERTIFICATE OF CORRECTION

Page 1 of 2

PATENT NO. : 10,979,197 B2
APPLICATION NO. : 16/334179
DATED : April 13, 2021
INVENTOR(S) : Skarve et al.

It is certified that error appears in the above-identified patent and that said Letters Patent is hereby corrected as shown below:

In the Specification

In Column 1, Line 17, delete "(STA)" and insert -- (STAs) --, therefor.

In Column 1, Line 18, delete "(UE)," and insert -- (UEs), --, therefor.

In Column 1, Line 19, delete "(CN)." and insert -- (CNs). --, therefor.

In Column 2, Line 42, delete "(DU)." and insert -- (DUs). --, therefor.

In Column 2, Line 44, delete "(routed," and insert -- routed, --, therefor.

In Column 3, Line 2, delete "(PDU)." and insert -- (PDUs). --, therefor.

In Column 3, Line 2, delete "consists in" and insert -- consists of --, therefor.

In Column 3, Lines 7-8, delete "ultra-reliable low latency communications (URLLC) services." and insert -- ultra-reliable low latency communication (URLLC) services. --, therefor.

In Column 3, Line 35, delete "(SDU)" and insert -- (SDUs) --, therefor.

In Column 3, Line 36, delete "(PDU)" and insert -- (PDUs) --, therefor.

In Column 3, Line 50, delete "PDU_WITHOUT_POLL >=pollPDU;" and insert -- PDU_WITHOUT_POLL >=pollPDU; --, therefor.

In Column 4, Line 8, delete "(SN)" and insert -- (SNs) --, therefor.

In Column 5, Line 49, delete "This even" and insert -- Thus even --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,979,197 B2

In Column 7, Line 21, delete "(AN)," and insert -- (ANs), --, therefor.

In Column 7, Line 21, delete "(CN)." and insert -- (CNs). --, therefor.

In Column 9, Line 40, delete "acknowledged" and insert -- Acknowledged --, therefor.

In Column 10, Line 28, delete "related all" and insert -- related to all --, therefor.

In Column 12, Line 16, delete "transmitting device 12" and insert -- transmitting device 120 --, therefor.

In Column 12, Line 55, delete "Remote radio Unit" and insert -- Remote Radio Unit --, therefor.

In Column 12, Line 66, delete "laptop embedded equipped (LEE)," and insert -- laptop embedded equipment (LEE), --, therefor.

In Column 13, Line 6, delete "Data rate" and insert -- Data rates --, therefor.

In Column 15, Line 12, delete "hardware 3333" and insert -- hardware 3335 --, therefor.

In Column 15, Line 16, delete "Hardware 3333" and insert -- Hardware 3335 --, therefor.

In Column 16, Line 10, delete "hardware 3333" and insert -- hardware 3335 --, therefor.

In Column 17, Line 66, delete "according one" and insert -- according to one --, therefor.

In Column 18, Line 18, delete "eMTC" and insert -- eMTCs --, therefor.